United States Patent
Rabinowitz

(10) Patent No.: US 7,133,183 B2
(45) Date of Patent: Nov. 7, 2006

(54) MICRO-OPTICS SOLAR ENERGY CONCENTRATOR

(76) Inventor: Mario Rabinowitz, 715 Lakemead Way, Redwood City, CA (US) 94062

(*) Notice: Subject to any disclaimer, the term of this patent is extended or adjusted under 35 U.S.C. 154(b) by 260 days.

(21) Appl. No.: 10/794,236

(22) Filed: Mar. 6, 2004

(65) Prior Publication Data

US 2005/0195465 A1    Sep. 8, 2005

(51) Int. Cl.
  *G02B 26/00*  (2006.01)
  *G02F 1/29*  (2006.01)
  *G09G 3/34*  (2006.01)

(52) U.S. Cl. .......... 359/290; 359/295; 359/296; 359/298; 359/316; 359/318; 345/85; 345/86; 345/107; 345/108; 345/111

(58) Field of Classification Search ........ 359/280, 359/282, 283, 295, 290–292, 296, 298, 315, 359/316, 318; 345/84–86, 107, 108, 111
  See application file for complete search history.

(56) References Cited

U.S. PATENT DOCUMENTS

| | | | | |
|---|---|---|---|---|
| 5,914,805 A | * | 6/1999 | Crowley | 359/296 |
| 6,542,283 B1 | * | 4/2003 | Sheridon | 359/296 |
| 2005/0213878 A1 | * | 9/2005 | Akagawa et al. | 385/18 |

* cited by examiner

Primary Examiner—Evelyn A. Lester

(57) ABSTRACT

Due to an ever growing shortage of conventional energy sources, there is an increasingly intense interest in harnessing solar energy. The instant invention can contribute to the goal of achieving environmentally clean solar energy to be competitive with conventional energy sources. Method and apparatus are presented for coupling to a transparent sheet with an embedded array of preformed or formable mirrored micro-balls for use in a solar energy concentrator, and functionally similar applications such as optical switches and solar rocket assist. Mirrored micro-balls and particulate formable mirrors in cells are covered with a thin spherical shell of lubricating liquid so that they are free to rotate in an almost frictionless encapsulation in the sheet. Induced polarization electric or magnetic dipoles in the mirrors provide a method of controlling the alignment of the mirrored balls. Electrophoretically and magnetophoretically forming mirrors in situ on a rigid surface in a rotatable cell are also disclosed. Confining the balls and cells in cavities within a single sheet, rather than loosely between two sheets, allows for greater alignment accuracy which is needed for higher concentrations with gains greater than 10×. Immersing balls and cells in a lubricating fluid permits nearly frictionless rotation which reduces the power requirement for rotation, and further enables greater alignment accuracy as the impediment of unnecessary friction need not be overcome.

20 Claims, 4 Drawing Sheets

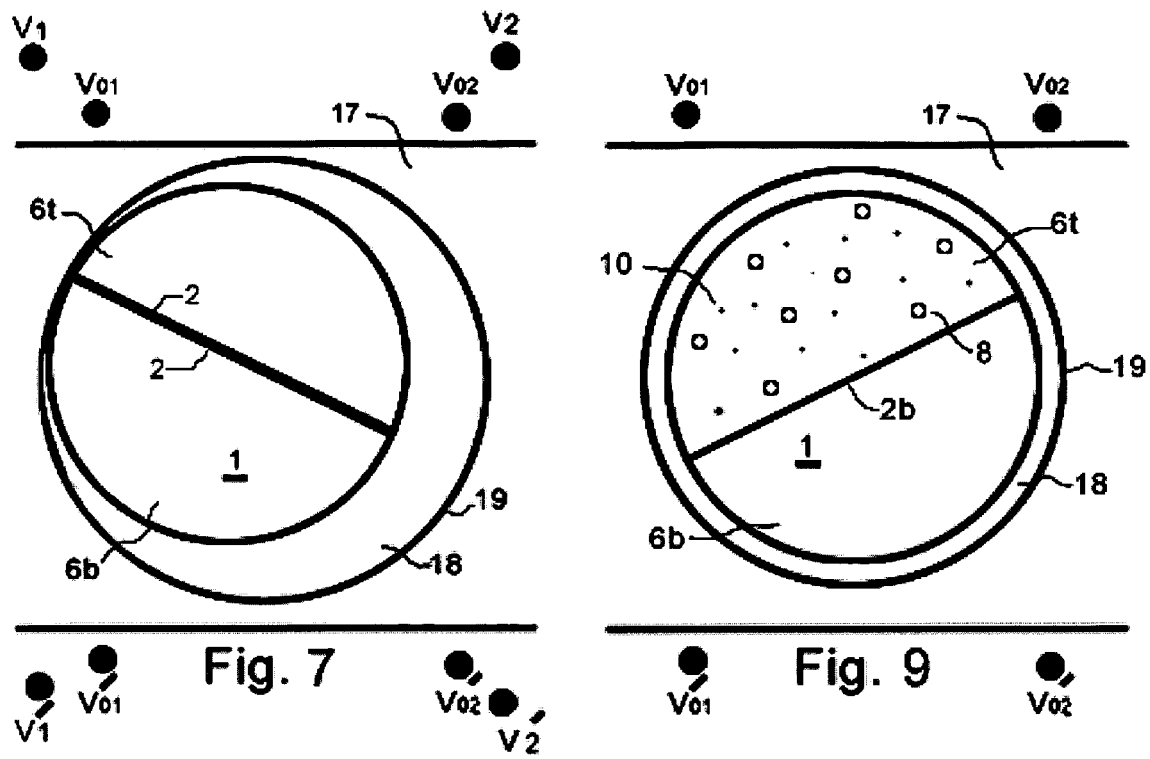
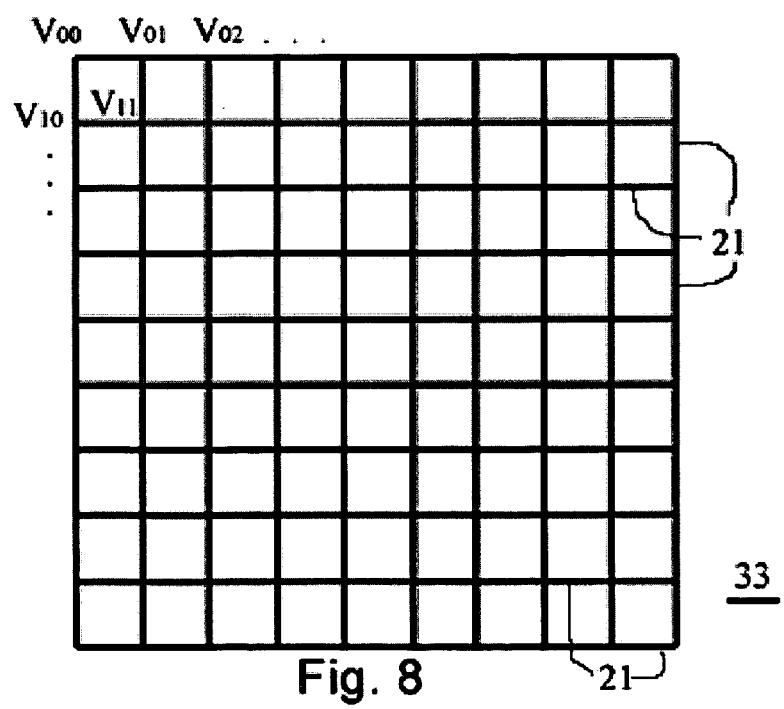

US 7,133,183 B2

MICRO-OPTICS SOLAR ENERGY CONCENTRATOR

INCORPORATION BY REFERENCE

The following owned in common U.S. patents, allowed patent applications, and pending patent applications are fully incorporated herein by reference:

U.S. Pat. No. 6,612,705, by Mark Davidson and Mario Rabinowitz "Mini-Optics Solar Energy Concentrator" issued on Sept. 2,2003.

U.S. Pat. No. 6,698,693 by Mark Davidson and Mario Rabinowitz, "Solar Propulsion Assist" issued on Mar. 2,2004.

U.S. Pat. No. 6,738,176 by Mario Rabinowitz and Mark Davidson, "Dynamic Multi-Wavelength Switching Ensemble" issued on May 18, 2004.

U.S. Publication No. 2005-003750-A1 by Mario Rabinowitz, "Spinning Concentrator Enhanced Solar Energy Alternating Current Producton". is Pending.

U.S. Publication No. Pat. No 6,964,486 by Mario Rabinowitz, "Alignment of Solar Concentrator Micro-Mirrors" is-Pending issued on Nov. 15, 2005.

BACKGROUND OF THE INVENTION

This improved invention provides a better means to achieve low cost affordable solar energy. It does so by greatly increasing the concentration factor over that which was hitherto possible, and hence further reducing the cost of solar concentrators which increase (concentrate) the density of solar energy incident on a solar energy converter. The utilization of solar energy has been encumbered by the high cost of energy converters such as photovoltaic solar cells. For example, this invention makes it possible to replace an even larger number of expensive solar cells with a small number of solar cells operating in conjunction with the inexpensive intelligent micro-optics of this invention. Thus the instant invention can contribute to the goal of achieving environmentally clean energy on a large enough scale to be competitive with conventional energy sources.

A limiting factor in U.S. Pat. No. 6,612,705, of which the inventor of this instant invention is a co-inventor, is that it is dificult to achieve a concentration greater than 10× because the mirrored balls are not closely enough confined between two sheets, permitting some lateral motion between the two sheets of that Patent. In that issued Patent, the balls have too large a translational degree of freedom, which problem is solved by the instant invention. The instant invention overcomes this problem by much more closely confining each mirrored ball in an individual cavity within a single sheet. Another problem of the issued U.S. Pat. No. 6,612,705, is that of having higher friction than can be readily tolerated, which also limits the exacting alignment required by the mirrored balls for concentrations much greater than 10×. The instant invention also overcomes the friction problem.

The 1978 Gyricon U.S. Pat. No. 4,126,854 of Sheridon, entitled "Twisting Ball Panel Display" is exclusively concerned with Displays. There is no mention of any other application than Displays, either specifically or by general statement. In this and other Sheridon patents, no mention is made of a mirror in the gyricon balls, nor is there any mention of specular reflection as would be obtained from a mirror. On the contrary, diffuse reflection needs to be increased from the balls so the Gyricon display may easily be observed from all angles. Certainly there is no anticipation of a solar concentrator application, solar propulsion assist, optical switching or any other micro-mirror application. Furthermore, a uniform monolayer(s) of micro-mirrored balls are preferred in these applications, whereas the Sheridon patent and related patents only teach a random dispersion of non-mirrored Gyricon balls.

The instant invention is primarily concerned with solar concentrator micro-mirrors in cavities in a single sheet, rather than two sheets, for more accurate alignment and for nearly frictionless rotation. However, it has broader applications wherever focusing planar mirrors are used for applications such as for solar propulsion assist and optical switching. In the instant invention the micro-mirrors can be either pre-formed (pre-existing), or formable in-situ.

Definitions

"Concentrator" as used herein in general is a micro-mirror system for focusing and reflecting light. In a solar energy context, it is that part of a Solar Collector system that directs and concentrates solar radiation onto a solar Receiver.

"Dielectric" refers to an insulating material in which an electric field can be sustained with a minimum power dissipation.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Electret" refers to a solid dielectric possessing persistent electric polarization, by virtue of a long time constant for decay of charge separation.

"Focusing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"ITO" is a thin conducting alloy of Indium/Tin Oxide that is transparent.

"Packing fraction" herein refers to the fraction of an available area occupied by the collection (ensemble) of rotatable elements.

"Plasticizer" as used herein refers specifically to a dielectric plasticizer fluid that is absorbed by an elastomer thereby causing it to swell thus creating a spherical shell around each of the micro-mirror balls which do not substantially absorb the plasticizer. More commonly plastizers are added to a material to make it softer, more flexible, or more moldable.

"Receiver" as used herein in general is a system for receiving reflected light. In a solar energy context, it receives concentrated solar radiation from the micro-mirror assembly for the conversion of solar energy into more conveniently usable energy such as electricity.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light, among other reasons.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Van der Waals force" as used herein refers to an attrative force between atoms or molecules. It can arise because a fluctuating dipole moment in one molecule induces a dipole moment in the other. The two dipole moments then attract.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

It is an object of the present invention to provide a single sheet within which each micro-mirror may be aligned with high accuracy as part of a solar concentrator system.

It is another object of the present invention to provide a single sheet within which each micro-mirror may rotate in an almost frictionless encapsulation as part of a solar concentrator system.

An aspect of this invention is to provide apparatus for nearly frictionless rotation of micro-mirrored balls i.e. spheres or cylinders.

It is a further aspect of the present invention to achieve a solar concentrator that can tolerate a range of micro-mirrored ball sizes.

Another aspect of this invention is to control the size of the cavity which encapsulates the micro-mirrored balls.

There are many aspects of this invention for single sheets that hold mirrored balls in solar concentrators and analogous applications. All the aspects apply to the same goal of being technically sound, economically viable, practical, and efficient.

Other objects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

BRIEF DESCRIPTION OF THE DRAWINGS

FIG. 7 is a cross-sectional view of a rotatable element, with an induced dipole micro-mirror, in a holding mode between alignments.

FIG. 8 is a schematic top view showing an electronic control grid for rotating the reflecting elements of a concentrator.

FIG. 9 is a cross-sectional view of a mirrorable cell filled with dispersed electric or ferromagnetic particles.

DETAILED DESCRIPTION OF THE PRESENTLY PREFERRED EMBODIMENTS

Figure 1:
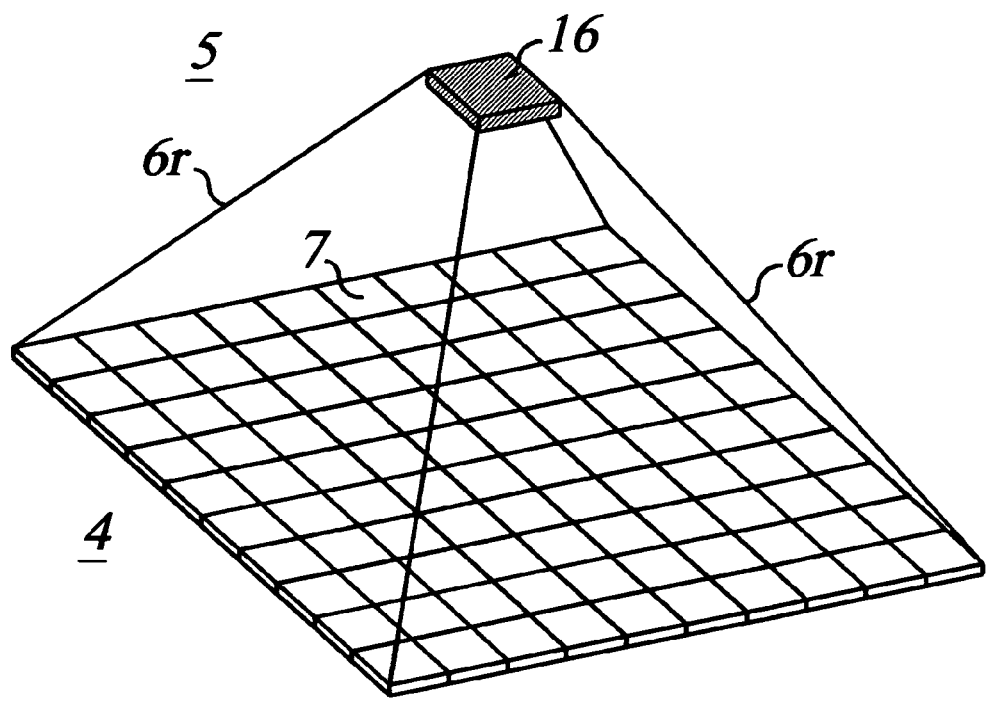
FIG. 1 is a perspective view of a pyramid configuration solar collection system utilizing a micro-optics concentrator which together with a receiver form a unique solar collection system.

FIG. 1 is a perspective view of a pyramid configuration solar collection system 5 consisting of a micro-optics concentrator 4 and receiver 16 above it, supported by rods 6r. The micro-optics concentrator 4 may be a single large monolithic configuration, or as shown, it is preferably made up of separate modules 7 which are fastened together and secured to an existing surface such as the roof of a building or the ground. This facilitates installation, maintenance, and repair operations.

The pyramidal solar collection system 5 is a preferred embodiment when the concentration factor is roughly >10× and substantial forces of nature such as storms and earthquakes may be encountered. The receiver 16 is perched approximately above the center of the concentrator, with the rods making a roughly 45 degree angle with respect to the concentrator. This is an approximately desirable position and angle, but not critical.

Figure 2:
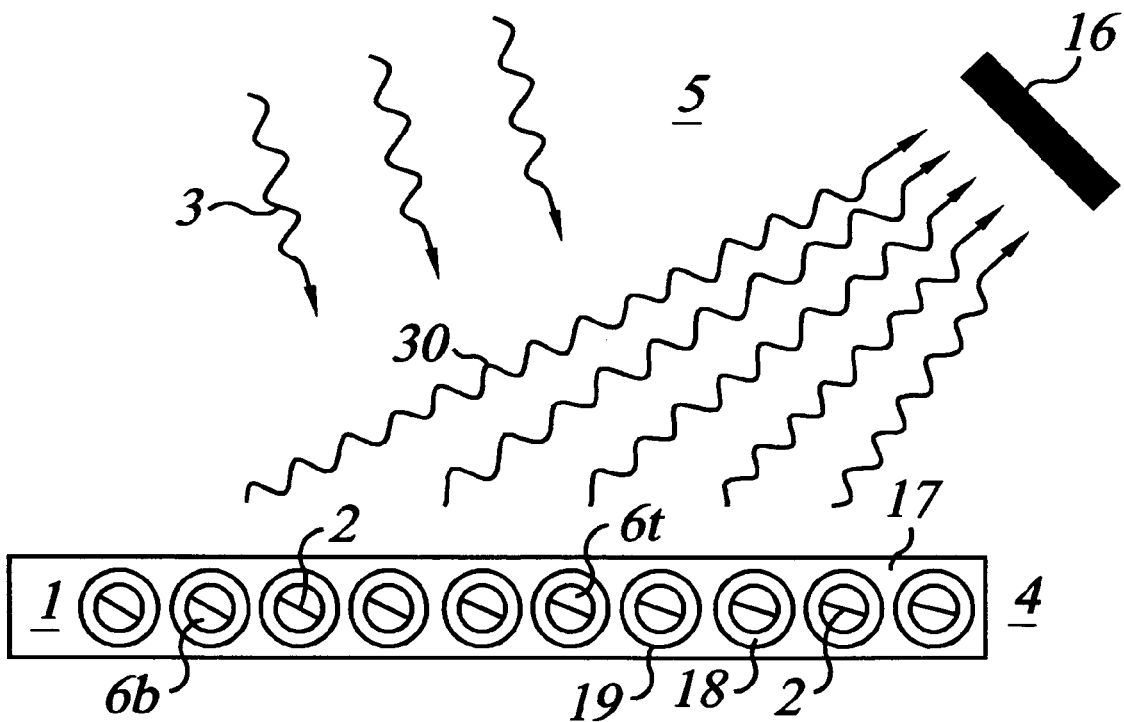
FIG. 2 is a cross-sectional view of an ensemble of encapsulated and lubricated rotatable micro-mirrors which are constituents of a micro-optics concentrator, with the micro-mirrors focusing the incident sunlight onto a receiver.
Figure 3:
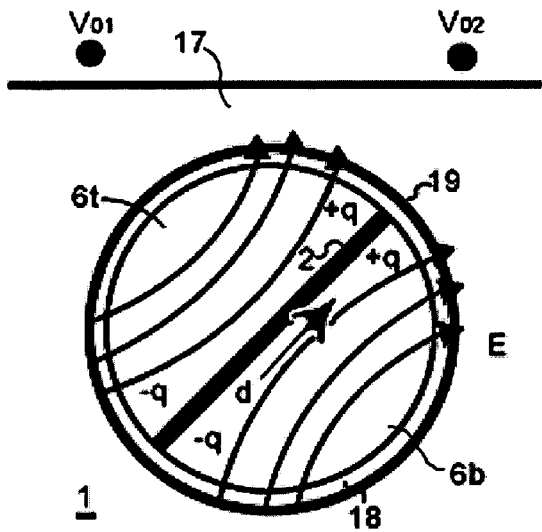
FIG. 3 is a cross-sectional view of a rotatable element with an induced dipole micro-mirror aligned at a tilted angle with respect to the top surface of the embedding sheet. An ensemble of such elements track the sun and focus the sun's light beam onto a receiver.
Figure 4:
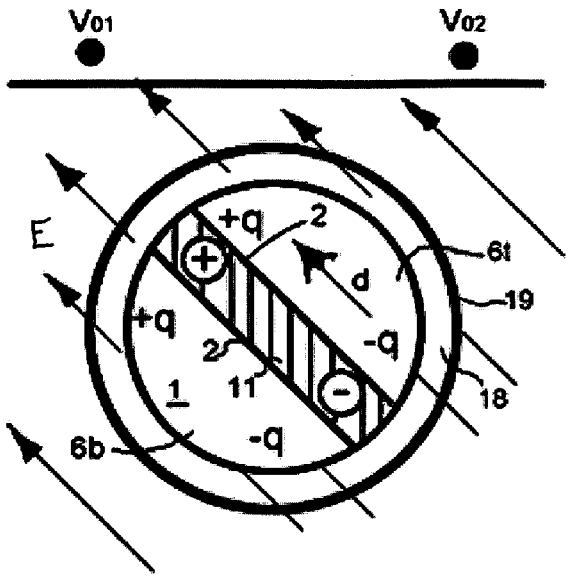
FIG. 4 is a cross-sectional view of a rotatable element with an electret dipole sandwiched between induced dipole micro-mirrors aligned at a tilted angle with respect to an embedding sheet where an ensemble of such elements are a major constituent of a micro-optics concentrator.

FIG. 2 is a cross-sectional view of a solar collection system 5 consisting of a micro-optics ensemble 4 of an individually rotatable monolayer of elements 1 (balls) dispersed in a top transparent single sheet 17, showing the embedded micro-mirrors 2 which focus the incident sunlight 3 as concentrated light of the reflected wave 30 onto a receiver 16. The receiver 16 as used herein denotes any device for the conversion of solar energy such as electricity, heat, pressure, concentrated light, etc. One monolayer of elements 1 as shown is a preferable embodiment, though more than one layer may be used. For some purposes a random dispersion of elements 1 is acceptable. U.S. Pat. No. 6,612,705 of which the inventor of this instant invention is a co-inventor details some of the ways for alignment of the micro-mirrors 2 to focus incident light. FIGS. 3 and 4 of the instant invention will detail preferred methods of alignment that are unique to mirrored elements 1. The elements 1 may be spherical or cylindrical, and for convenience will sometimes be referred to as balls. Spherical elements are preferable for two-axis tracking but have a smaller packing fraction than cylindrical elements whose packing fraction can approach 1. The top hemisphere (or hemicylinder) 6t of elements 1 is transparent. The bottom hemisphere (or hemicylinder) 6b of elements 1 may be transparent or opaque, though they are preferably transparent. The sheet 17 is preferably a silicone elastomer sheet.

The elements 1 with embedded micro-mirrors 2 are each surrounded by and suspended in a dielectric lubricating liquid 18 that allows them to rotate freely inside an enlarged cavity 19 that encapsulates them. It is preferable to utilize a liquid 18 whose index of refraction matches the clear hemisphere or clear hemicylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation.

The minimum diameter of elements 1 can be assessed from the Rayleigh limit $$d = \frac{0.61\lambda}{n \sin u} \sim 10\lambda,$$

where d is the minimum diameter of elements 1, $\lambda \sim 4000$ Å is the minimum visible wavelength, n is the index of refraction $\sim 1$ of element 1 (the medium in which the incident light is reflected), and u is the half angle admitted by elements 1. Thus $d \sim 40,000$ Å ($4 \times 10^{-6}$ m, i.e. 4 microns) is the minimum diameter of elements 1. A maximum for the diameter of elements 1 is $\sim 10$ mm. A preferable range is 50 microns to 400 microns.

If the focusing planar mini-mirrors concentrate the solar radiation by a factor of 100, the total increase in power density reaching the collector would be 100 times greater than the incident power of the sun. Thus the receiver area need be only $\sim 1\%$ the size of one receiving solar radiation directly. Although the total capital and installation cost of this improved system may be more than 1% of a direct system, there will nevertheless be substantial savings.

For optical reasons, it is preferable to have the elements 1 as close as possible to the top surface through which light is incident and returns. For necessary mechanical strength of the sheet, the bottom of the elastomer sheet 17 may be far from the balls; or other materials may be laminated to the bottom. The elastomer sheet 17 may be made in modular segments or if made larger than the desired area, after the elastomer sheet 17 solidifies, it is cut into modules. During the manufacturing stage, the elements 1 are held rigidly captive in the elastomer 17.

A single monolayer of elements 1 is preferred as this reduces manufacturing costs, and light need only traverse a thin layer of material in reaching and reflecting from the micro-mirrors 2. A single monolayer of elements 1 can be introduced into an uncured elastomer sheet 17 on a disposable tray. If desired, more than one monolayer of elements 1 may be similarly formed during manufacture by the concurrent use of two or more disposable trays, one below the other. If this is done, it is preferable to have successive layers jogged to increase the packing fraction seen by the incident light. Alternatively, the elastomer sheet 17 can be formed by thoroughly mixing the elements 1 with the uncured liquid, and then curing. The optically transparent material is then cured by heating, and/or chemically.

During manufacture, a cured elastomer sheet 17 is swollen by immersion in an infiltrating liquid 18. Thus spherical shells of lubricating liquid 18 surround each element 1 inside an enlarged cavity 19. The immersed elastomer sheet 17 soaks up the dielectric lubricating liquid 18, causing it to expand, creating spherical or cylindrical cavities (as the case may be) around each element 1. The liquid 18 may be a single molecular species which can infiltrate the sheet 17 or a combination of different molecular species which in concert can infiltrate the sheet 17. This forms spherical or cylindrical shells of liquid 18 around each element 1 enabling the elements 1 to float and rotate freely, Now that the elements 1 (balls) have been liberated to float and rotate freely, they can more easily respond to coupling fields for alignment and focusing than in U.S. Pat. No. 6,612,705 of which one inventor of this instant invention is the co-inventor.

When not all candidate liquids 18 have the entire combination of desirable properties of not causing too much swelling, being a good dielectric, being a good lubricant with low viscosity, being transparent, being non-toxic, etc., it is preferable to use a combination of two or more liquids. If the one that primarily controls the swelling (but does not have the other desirable properties) is more volatile, then it can be displaced by the other liquid(s) as it is removed by evaporative heating. If necessary, after the desired degree of swelling has been achieved, the swollen sheet can be heated in a bath containing only the liquid(s) 18 that have the desired properties.

A lubricating layer of liquid 18 that is about a 10% radial liquid coating gives a ratio of the volume of liquid 18 and sheet 17 to the volume of spherical balls of:

$$\frac{V_{sheet}}{V_{balls}} = \frac{(2[1.1r])^3}{\left(\frac{4}{3}\pi r^3\right)} = 2.54.$$

Liquids that cause little or no swelling may be combined with the good swellers, for their desirable properties or to help regulate swelling. The relative percentages can easily be determined empirically. Preferably, the two sets of liquids are mutually soluble for uniformity of mixture, and so that they may be soaked up together.

In order to have a high packing fraction of the micro-mirrors it is important to control the swelling of the sheet so that the balls remain as close together as feasible. The presently preferred degree of swelling of the cavity radius around each ball is between 2% and 15%. To minimize fricton and concomitantly reduce the torque power requirement, it is imperative that at least a 1% radius coating of liquid lubricant completely coats each ball. If the sheet is removed from the dielectric plastizer lubricating liquid to stop the swelling process, prior to achievement of at least a 1% radial lubricant coating, it will be difficult to properly align the micro-mirrors. The degree of swelling can be controlled through use of a larger percentage non-swelling liquid mixed with a smaller percentage swelling liquid, and subsequent removal by evaporation of the swelling liquid.

It is preferable to make the elements 1 from a material that does not easily absorb the liquid plasticizer 18 or does so at a much lower rate than the cured elastomer sheet 17. Glass is a preferable material for the elements 1 both for this reason as well as for its resistance to ultraviolet degradation.

In addition to reducing rotational friction, another advantage of encapsulation of the elements 1 is that one can more easily tolerate a range of ball sizes. In those cases when a close range is desired, it is not necessary to force expensive manufacturing tolerances to make balls of all of about the same size. The balls can be sorted by sieves into size ranges.

FIG. 3 is a cross-sectional view of a rotatable element 1 with an induced dipole micro-mirror 2 aligned at a tilted angle with respect to the top surface of a single transparent sheet 17. The element 1 has a transparent top hemisphere (or hemicylinder) 6t, and a bottom hemisphere (or hemicylinder) 6b that may be either transparent or opaque. It is necessary for the top hemisphere 6t to be transparent for light to enter and be reflected from micro-mirror 2. The bottom hemisphere 6b may be opaque, preferably with dielectric properties similar to top hemisphere 6t to minimize the effect of the zeta potential.

The induced dipole moment d of the micro-mirror 2, with induced charges +q and −q at its ends, is shown parallel to the main components of the applied dominant electric field E. When the electric field E is produced by grid wires rather than slabs (segmented electrodes) it is less uniform as shown. The electric field is produced by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

The element 1 is completely encompassed with a lubricating fluid 18 which is encapsulated inside a concentric cavity 19. Thus the confined and lubricated element 1 can make a nearly frictionless rotation, with hardly any undesirable displacement An ensemble of such elements can thus be aligned as a group with the application of moderate power. It is preferable to utilize a liquid 18 whose index of refraction matches the clear hemisphere or clear hemicylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation.

Mirrors are normally made of a conductive metallic coating. In an applied electrostatic field, E, a dipole moment is induced in the metallic conducting material of the micromirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a pivoted conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

If alignment is attempted in a conventional manner such as is used in Gyricon displays, the induced polarization electric dipole field in a mirror presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field parallel to the axis of symmetry when a sphere is made from two dielectrically different hemispheres due to their interaction with the fluid surrounding it. The induced dipole moment in a mirror is perpendicular to the axis of symmetry. One way to eliminate or greatly diminish the effect of the zeta potential is to make the surface of both hemispheres out of the same material. This would be quite difficult for Gyricon displays because they require optically different surfaces e.g. black and white, or e.g. cyan, magenta, and yellow for color mixing.

FIG. 4 is a cross-sectional view of a rotatable element 1 with an electret dipole 11 sandwiched between induced dipole micro-mirrors 2 aligned at a tilted angle with respect to the top transparent surface of a single sheet 17, where an ensemble of such elements are a constituent of a microoptics concentrator. The element 1 of top 6t and bottom 6b is completely covered with a lubricating fluid 19 which is encapsulated inside a concentric cavity 19. The induced dipole moment d of the micro-mirror 2, with induced charges +q and −q at its ends, is shown parallel to a uniform dominant applied electric field E. When the electric field E is produced by slabs (segmented electrode) rather than grid wires, it is more uniform as shown. The electric field is produced by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

In the electric orientation mode of control, the induced and/or permanent electric dipole d in each ball is acted on by a torque τ, equal to the vector product of the electric dipole moment d, of the dipole and the electric field E:

$$\tau = d \times E$$

which has the magnitude dE sin θ, where θ is the angle between the d and E vectors. If there is no other torque acting on the ball and friction is negligible, the ball will come to rest at the null torque orientation where the vectors d and E are parallel, and the dipole moment lines up with the electric field in equilibrium.

In the instant invention, no problem arises by making both hemispheres 6t and 6b out of the same transparent material to eliminate or minimize the zeta potential. In fact this presents an opportunity to both utilize the mirror induced polarization electric dipole field and to have two mirror surfaces. With two mirror surfaces, an option presents itself to use the better surface as the surface that reflects the light, and furthermore to have a standby mirror in each element should one of the mirrors degrade. As shown, a permanent electret dipole 11 is sandwiched between the two induced dipole mirrors 2 to further enhance the dipole field d that interacts with the addressable alignment fields.

A signal sets the voltages so that $V_{o1} < V_{o2}$, $V'_{o1} < V'_{o2}$, $V_{o1} < V'_{o1}$, and $V_{o2} < V'_{o2}$, producing an approximately uniform applied electric field E is produced that is tilted with respect to to the top surface of sheet 17 as shown. The micro-mirrors 2 align themselves parallel to the electric field E due to the induced dipole field polarization of the mirrors, and permanent dipole of the electret 11. For balls, two-axis tracking is possible by additional alignment of the micromirrors 2 out of the plane of the paper. This is accomplished by similar voltage relationships to those already described. Cylinders would be restricted to single-axis tracking. The chosen alignment angle i.e. tilt angle of the rotatable elements 1 can be held in place by any of a number of methods to be described in conjunction with FIGS. 6 and 7. Thus during the interval between alignments, the alignment voltages may be switched off to conserve power.

Figure 5:
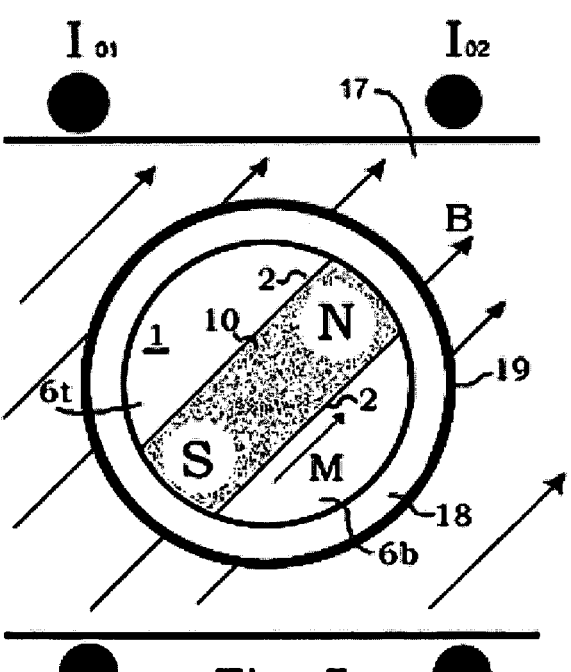
FIG. 5 is a cross-sectional view of a ferromagnetic bipolar sphere with an equatorial flat reflecting surface. This sphere is one of a multitude of optical elements, which track the sun and focus the sunlight onto a receiver.

FIG. 5 is a cross-sectional view of a rotatable element 1 with ferromagnetic material 10 with induced North pole N and South pole S, of dipole M, lined up as shown with an approximately uniform magnetic flux density B. This magnetically charged bipolar ball 1 with top 6$t$ and bottom 6$b$, has mirrors 2 sandwiching ferromagnetic material 10. The mirrors 2 themselves may themselves be ferromagnetic. For a stronger dipole M, the ferromagnetic material 10 itself may be a permanent magnet, just as an electret 11 augments the induced electric dipole field d in the mirrors for the embodiment of FIG. 4. This ball inside a top transparent single sheet 17 is one of a multitude of optical elements 1, which track the sun and focus the sunlight onto a receiver. The element 1 is completely covered with a lubricating fluid 18 which is encapsulated inside a concentric cavity 19. Instead of voltages to produce an electric field as before, here currents I above and I' below are used to produce the magnetic alignment field B. A magnetic field generated by the four conductors nearest a desired element 1 controls its orientation as will be described next.

In the magnetic orientation mode of control, the induced and/or permanent magnetic dipole M in each ball is acted on by a torque $\tau$, equal to the vector product of the magnetic dipole moment M, of the dipole and the magnetic field H=B/$\mu$, where $\mu$ is the permeability of the medium:

$$\tau = M \times H$$

which has the magnitude MH sin $\theta$, where $\theta$ is the angle between the M and H vectors. If there is no other torque acting on the ball and friction is negligible, the ball will come to rest at the null torque orientation where the vectors M and H are parallel, and the dipole moment lines up with the magnetic field lines in equilibrium. The classic example of this is a powder of iron filings which line up with field lines when placed near a permanent magnet. Orientation of the magnetic field can be controlled by small magnetic circuits with one or more coils placed around the ball mirror. In the most general case three orthogonal coils whose currents are controlled by electronic means can provide for three independent orthogonal components of the magnetic field and thus for arbitrary orientation of the ball. This can most easily be achieved by different means, one of which is by using a high permeability material such as mu metal to route the magnetic field lines to the desired position around the ball. The ball would be in the gaps of the magnetic circuits and they would be arranged so that the field produced by each are orthogonal to the fields of the other circuits at the position of the rotating ball. The magnetic ball would rotate to line up with the net vectorial external field, which can be quickly changed for each switching operation.

Figure 6:
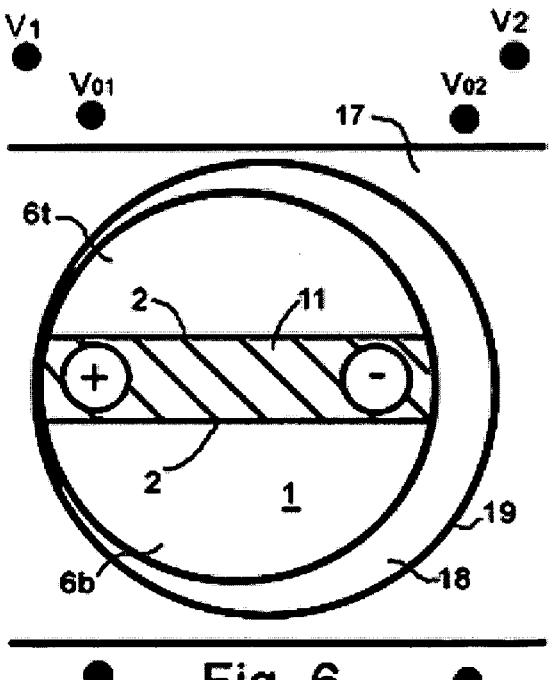
FIG. 6 is a cross-sectional view of a rotatable element, with an electret dipole sandwiched between induced dipole micro-mirrors, in a holding mode between alignments.

FIG. 6 is a cross-sectional view of a rotatable element 1, with an electret dipole 11 sandwiched between induced dipole micro-mirrors 2, in a holding mode between alignments. After alignment of a rotatable element 1, a translational thrust electric field can be applied which brings one side of the electret (the positive side in the case shown) closer to the cavity wall so that a net image charge attractive force holds the ball in fixed orientation permitting the alignment electric field to be switched off. The translational-thrust electric field can be supplied by additional electrodes which are electrically isolated by insulating layers from the electrodes shown. In the case shown, these additional electrodes apply voltages V2>V1, V2'>V1', V1=V1', and V2=V2'. The translational thrust electric field need not be applied on an individual basis to each element 1 but may be applied to large groups of balls collectively. The translational thrust electric field is reversed to free each element 1 from its contact with the wall of the concentric cavity 19, to be free to rotate. After rotation, the elements 1 are again driven by the translational thrust electric field for holding against the walls of the concentric cavities 19 with the balls 1 retaining their new orientation.

Another way to "hold" the chosen alignment angle i.e. tilt angle of the rotatable elements 1 is also by mechanical pressure on the single sheet as by piezo-electric effect, and/or friction. A holding effect can be achieved by slightly detaining the cavities 19 or voids 16 so that they take on an asymmetrical shape which slightly pinches the elements 1 with frictional forces. The dominant alignment electric field is applied for rotation of the elements 1 when the frictional pinching force is removed. Deformation and restoral of the wall of the cavities 19 can be achieved by a pulsed piezo-electric device in contact with the top transparent single sheet 17.

Thus during the interval between alignments, the alignment voltages may be switched off to conserve power. The two sheet concentrator of U.S. Pat. No. 6,612,705 (of which one of the present inventors is a co-inventor), can use a plenum to slightly force the two containment sheets apart, to free the elements 1 when a new alignment is desired. The one sheet of the instant invention with encapsulated balls differs substantially from the two sheet invention of U.S. Pat. No. 6,612,705 so that other means must be used for "HOLDING" the rotatable elements 1 between alignments.

FIG. 7 is a cross-sectional view of a rotatable element 1 pressed against the wall of a cavity 19 in a holding mode between alignments, with an induced dipole micro-mirror 2, which element 1 is surrounded with a lubricating liquid 18. The translational thrust electric field provided by the voltage sources $V_{o1}$, $V_{o2}$, $V'_{o1}$, and $V'_{o2}$, forces the elements 1 up against and to have frictional contact with the proximate portion. This can be achieved by using elements 1 with a non-uniform surface texture, that is, smoother in one hemisphere than in the other. Even without a frictional effect, pressing the element 1 into close contact with the wall of the cavity 19 brings a Van der Waals force of attraction into play between the element 1 and the wall of the cavity 19.

Another non-frictional method is to hold the elements 1 in place against the walls of each cavity 19 by means of geometric constraints. If slightly elipsoidal elements 1 are used, the elements 1 will offer greater resistance to rotation when held against the cavity walls 19, but can rotate easily when allowed to float in each cavity.

Similar holding capability can also be provided for the magnetic elements 1 of FIG. 5. In this structure, the magnetic elements 1 are translationally thrust electromagnetically to the wall of the cavity 19. The magnetic elements 1 can be held against the walls of the cavities 19 by similar methods to that of electric elements to prevent rotation as described in conjunction with FIG. 6.

Furthermore a holding capability for either magnetic or electrostatic elements 1 can also be achieved by having the surface area of one Zeta potential of the top material 6$t$ (hemisphere or hemicylinder) of the particles larger than the surface area of the other, different Zeta potential bottom material 6$b$ of the elements 1. This will create, in cooperation with the liquid 18, a net electrostatic charge on the particles which will provide a memory effect by causing the particles to be pushed against a wall of each cavity in the presence of a translational thrust electric field acting independently of the alignment field.

FIG. 8 is a schematic top view showing an electronic control grid 33 for matrix addressing of the rotational alignment of the mirrored elements 1. This grid 33 can be laid on the bottom of the sheet 17, on the top and bottom of sheet 17, on the top of sheet 17 with a ground plane on the bottom of sheet 17, etc. In order to avoid having several similar looking figures, this schematic may be thought of as a representation of any of several addressing arrays. It may be a wire grid array with the vertical wires on top of sheet 17, and the horizontal wires on the bottom of sheet 17. It may be an actual connected grid with Thin Film Transistors (TFTs) at the junctions. In this case it is preferable to have use Polymer based TFTs for flexibility. The grid 33 is preferably a segmented array with each square being a separate insulated slab. In this case, the horizontal and vertical lines represent insulation between adjacent segments or slabs. Where necessary, the grid or slabs may be made of a thin conducting alloy of Indium/Tin Oxide (ITO) that is transparent. The common element of all of these electrostatic embodiments is the ability to impress the voltage $V_{ij}$ at the ij th node either statically or by means of a travelling wave. To minimize power dissipation, it is desirable to make resistive components 21 highly resistive so that a given voltage drop is accomplished with a minimum of current flow and hence with a minimum of power dissipation.

As previously described, the elements 1 are capable of rotating in any direction (two-axis response) in responding to a selectively applied electric field by the electronic control grid 33. The electronic control grid 33 is made of resistive components 21. In one embodiment, the elements 1 are sandwiched between the resistive electronic control grid 33 and a transparent ground plane. The orientation of the elements 1 is determined by controlling the voltages V at the nodes of the grid such as those shown $V_{00}$, $V_{01}$, $V_{02}$, $V_{10}$, $V_{11}$ with voltage $V_{ij}$ at the ij th node. The voltage $V_{ij}$ can be controlled by a small inexpensive computer with analog voltage outputs. The electronic control grid 33 is similar in construction and function to analogous grids used in personal computer boards, in flat panel monitors, in Gyricon displays, and in E-ink displays. Similarly, small offset ferritic current loops around each cell can provide local magnetic fields for the orientation function of elements with magnetic dipoles to line up with the net external magnetic vector.

Application of a voltage between successive nodes can produce an electric field in the plane of the planar minimirror. Application of a voltage between a node and the ground plane can produce an electric field perpendicular to the planar micro-mirror array to control the orientation angle of the active reflecting/switching micro-mirrors. In the case of elements 1 which contain a combination of orthogonal electric and magnetic dipoles, the orientation function may be separated for orientation in the plane and orientation perpendicular to the plane by each of the fields.

In the magnetic case, each square represents a current loop where adjacent loops are electrically isolated from each other. Orientation of the magnetic field and hence alignment of the balls can be controlled by small magnetic circuits with one or more current loops (coils) placed around each mirrored ball. In the most general case three orthogonal coils whose currents are controlled by electronic means can provide for three independent orthogonal components of the magnetic field and thus for arbitrary orientation of a ball. This can most easily be achieved by different means, one of which is by using a high permeability ferritic material such as mu metal to route the magnetic field lines to the desired position around the ball. The ball would be in the gaps of the magnetic circuits and they would be arranged so that the field produced by each is orthogonal to the other fields at the position of the rotating ball. A magnetic ball rotates to line up with the net vectorial external field, which can be easily changed for each new alignment.

FIG. 9 is a cross-sectional view of a mirrorable element 1 of transparent top 6t and transparent or opaque bottom 6b, which is a cell filled with a colloidal suspension of dispersed electric particles 8 or ferromagnetic particles 10 dispersed in a transparent fluid 70 in top 6t. A rigid receptive surface 2b is in the midplane (equatorial plane) of the rotatable element 1 upon which the particles 8 or 10 can be laid down to form a mirrored surface. The element 1 is immersed in a lubricating fluid 18, which is confined inside the cavity 19 in a top transparent single sheet 17. Fluid 18 may be the same fluid as the transparent fluid 70. Also shown are the matrix addressing control voltages $V_{01}$, $V_{02}$, $V'_{01}$, and $V'_{02}$.

Figure 10:
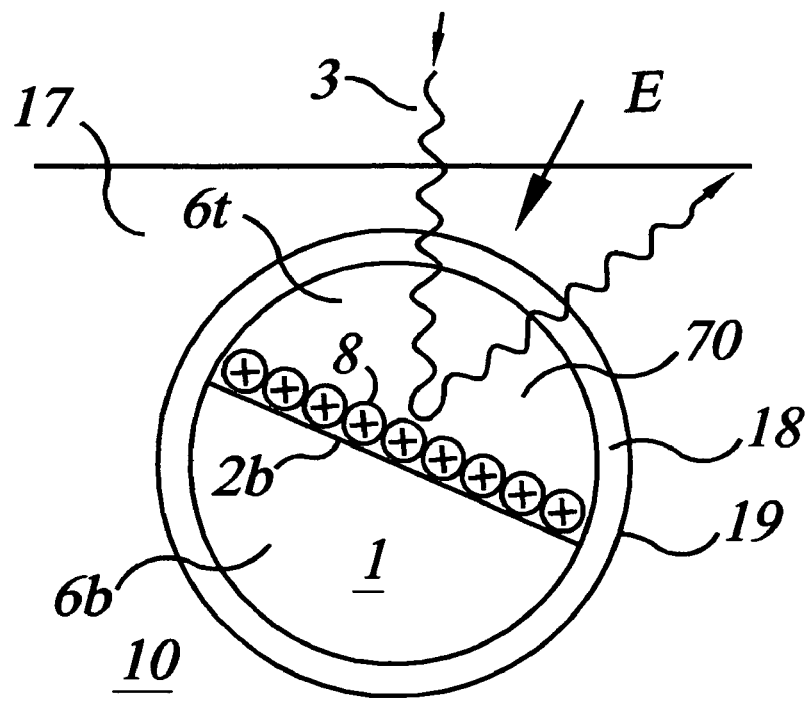
FIG. 10 is a cross-sectional view of a mirrorable electric fluid cell with a mirror formed from a colloidal suspension of dispersed shiny electrical particles in the fluid. This cell is one of a multitude of optical elements which track the sun and focus the sunlight onto a receiver.

FIG. 10 is a cross-sectional view of a mirrorable element 1 of transparent top 6t and transparent or opaque bottom 6b, which as shown is a cell filled with a colloidal suspension of dispersed shiny electrical particles 8, shown here to be positive +, but which may be negative. This cell is one of a multitude of optical elements 1 which track the sun and focus sunlight onto a receiver. This electrophoretic mirror formation utilizes particles 8 that are electrically charged, polarized, or polarizable, and highly reflecting in large aggregate form, but may be transparent when dispersed in the transparent fluid 70 in the top 6t, when they are considerably less than the wavelength of the incident radiation i.e. $<<4000$ Å ($4\times10^{-7}$ m). In the case when these particles 8 are polarized, or polarizable, the particles 8 are coated to prevent aggregation in the zero electric field case. When a focussing external electric field E is applied, the particles aggregate to form a mirror on the rigid surface 2b perpendicular to the applied field, whose direction can be changed as is described above in conjunction with the permanently formed mirrored balls. It is preferable to utilize a fluid 18 surrounding element 1 whose index of refraction matches element 1 (the clear hemisphere or clear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18, except that it may have a different density. Fluid 18 is confined by the cavity 19 in the single sheet 17.

The orientation of this flat mirrored surface can be controlled by an electric field E to reflect light 3. Until the electric field E is applied, as an optional capability the particles 8 and the fluid 70 can function as a transparent window when the particles 8 are nanosize i.e. much smaller than the wavelength of the incident light and the fluid 70 is transparent or translucent while they are dispersed in the fluid 70. For the case of dispersed transparency, the particles 8 should be $<<4000$ Å ($4\times10^{-7}$ m). This cell is one of a multitude of optical elements 1 which track and focus light onto a receiver. The particles 8 may include a wide variety of electomagnetically interactive materials such as electret, optoelectric, conducting, thermoelectric, electrophoretic, resistive, semiconductive, insulating, piezoelectric, or spin (e.g. spin glass) materials.

The element 1 cells are typically sandwiched between a transparent top electrode (e.g. Indium Tin Oxide) and a smaller bottom electrode so that the electric field lines converge toward the transparent bottom electrode. When the bottom electrode is positive, or there is no electric field E the particles are dispersed in widely separated positions in the fluid 70 presenting either a transparent, translucent, non-reflecting, or diffuse reflection surface to an incident light beam. When the bottom electrode is negative, the particles move together toward the receptive surface 2b and form a tight mirrored surface on rigid surface 2b. This migration with increased density at the mirrored receptive surface 2b forms a suitable reflecting micro-mirror.

Figure 11:
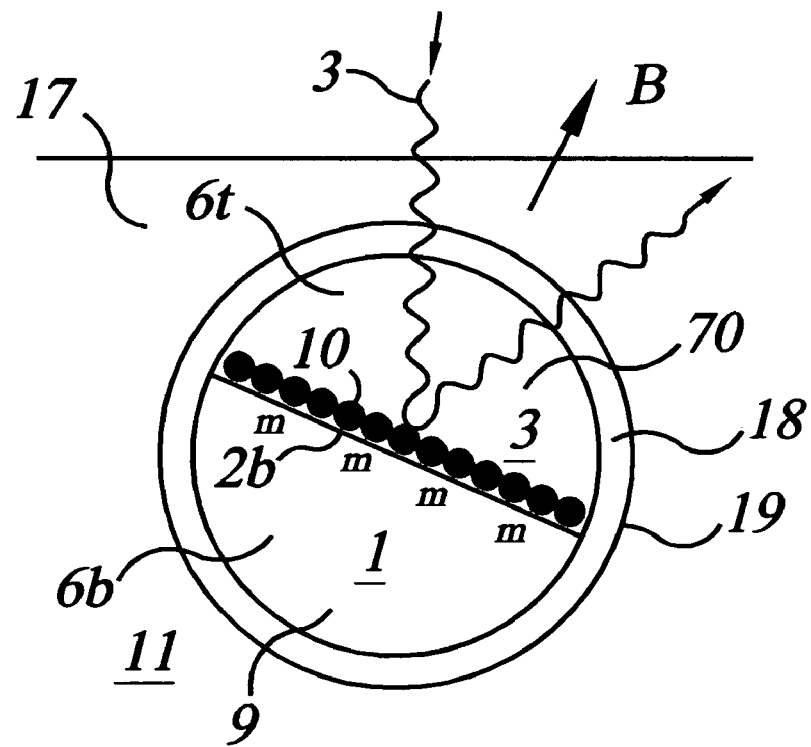
FIG. 11 is a cross-sectional view of a mirrorable ferrofluid cell with a mirror formed from a colloidal suspension of shiny ferromagnetic particles in the fluid. This cell is one of a multitude of optical elements which track the sun and focus the sunlight onto a receiver.

FIG. 11 is a cross-sectional view of a mirrorable element 1 of transparent top 6t and transparent or opaque bottom 6b, which is a ferrofluid cell filled as shown with a colloidal suspension of dispersed shiny magnetic particles 10, also indicated by the symbol m. This cell is one of a multitude of optical elements 1 which track and focus light onto a receiver. This electrophoretic mirror formation utilizes ferromagnetic particles 10 that are permanently magnetically polarized, or polarizable, and highly reflecting in large aggregate form, but may be transparent when dispersed in the transparent fluid 70 in the top 6t, when they are considerably less than the wavelength of the incident radiation i.e. <<4000 Å ($4 \times 10^{-7}$ m). In the case when these particles 10 are polarized, or polarizable, the particles 10 are coated to prevent aggregation in the zero magnetic field case. When a focussing external magnetic field B is applied, the particles aggregate to form a mirror on the receptive surface 2b perpendicular to the applied magnetic field, whose direction can be changed as is described above in conjunction with the balls with permanently formed mirrors. It is preferable to utilize a fluid 18 surrounding element 1 whose index of refraction matches element 1 (the clear hemisphere or clear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18, except that it may have a different density. Fluid 18 is confined by the cavity 19 in the single sheet 17.

The orientation of this flat mirrored surface can be controlled by the magnetic field B to reflect light 3. Until the magnetic field B is applied, as an optional capability the magnetic particles 10 and the fluid 70 can function as a transparent window when the particles 10 are nanosize i.e. much smaller than the wavelength of the incident light and the fluid 70 is transparent or translucent while they are dispersed in the fluid 70. For the case of dispersed transparency, the magnetic particles 10 should be <<4000 Å ($4 \times 10^{-7}$ m). This cell is one of a multitude of optical elements 1 which track and focus light onto a receiver. The particles 10 may include a wide variety of electromagnetically interactive materials such as magnetic, ferromagnetic, paramagnetic, diamagnetic, or spin (e.g. spin glass) materials.

The element 1 cells are typically sandwiched in a focusing top magnetic field so that the magnetic field lines converge toward the receptive surface 2b. When there is no magnetic field B the particles are dispersed in widely separated positions in the fluid 70 presenting either a transparent, translucent, non-reflecting, or diffuse reflection surface to an incident light beam. When an inhomogeneous electromagnetic field B of increasing gradient is applied, the particles 10 are drawn to the region of increasing gradient and coalesce to form a flat reflecting mirror on rigid surface 2b. The magnetic particles move together toward the rigid surface 2b forming a tight mirrored surface. This migration with increased density at the mirrored surface 2b produces a suitable reflecting micro-mirror.

Once formed, the orientation of the flat mirrored surface can be controlled by the magnetic field B by rotation of the element 1 as described in conjunction with FIG. 5, or an electric field as described in conjunction with FIG. 3, to properly reflect light 3. This cell is one of a multitude of optical elements 1 which track light 3 and focus the light 3 onto a receiver. The particles 10 are small enough to form a colloidal suspension, and are coated to prevent coalescence until the magnetic field is applied.

Differences and Advantages

The instant invention differs substantially from that of Gyricon and E-ink Displays with elements embodying: formed and formable embedded mirrors; induced polarization electric or magnetic dipoles in the mirrors with or without permanent electric or magnetic dipoles; the dipole fields being perpendicular to the axis of symmetry (rather than parallel); and in the application to Solar Energy and analogous functions such as Solar Propulsion Assist and Optical Switching.

The instant invention offers considerable novelty and advantages over U.S. Pat. No. 6,612,705, of which the inventor of this instant invention is a co-inventor. Induced polarization electric or magnetic dipoles in the mirrors is not only a unique method of controlling the alignment of the balls with respect to U.S. Pat. No. 6,612,705, it is also unique with respect to Displays. Electrophoretically and magnetophoretically forming mirrors in situ on, a rigid surface is unique with respect to U.S. Pat. No. 6,612,705 which forms them at the interface between two fluids. Other improvements and advantages with respect to U.S. Pat. No. 6,612,705 are:

- Confining the balls in cavities within a single sheet, rather than loosely between two sheets, allows for greater alignment accuracy which is needed for higher concentrations with gains greater than 10×.
- Immersing the balls in a lubricating fluid permits nearly frictionless rotation of the balls. This has a two-fold advantage. It reduces the power requirement for rotation, and further enables greater alignment accuracy as the impediment of unnecessary friction need not be overcome since the rotational torque is least at the desired orientation position.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. A micro-optics system for concentrating reflected light comprising:
    a) an array of rotatable planar mirrors in balls embedded in cavities in an optically transmissive sheet;
    b) each of said mirrored balls encapsulated in a surrounding medium of an optically transmissive fluid lubricant;
    c) dipole linkage to rotate said mirrored balls; and
    d) a receiver for energy conversion of the concentrated light.

2. The apparatus of claim 1, wherein said dipole is induced.

3. The apparatus of claim 1, wherein said dipole is permanent.

4. The apparatus of claim 1, wherein said dipole is electric.

5. The apparatus of claim 1, wherein said dipole is magnetic.

6. The apparatus of claim 1, wherein said micro-optics system is a solar concentrator.

7. The apparatus of claim 1, wherein said cavities maintain said mirrored balls in fixed orientation following rotational alignment.

8. A method for rotatating mirrored balls disposed in cavities in a micro-optics sheet for concentrating reflected light comprising the steps of;
   a) providing said sheet with an optically transmissive surface;
   b) providing an array of rotatable planar mirrors in said balls;
   c) surrounding said mirrored balls with a shell of a lubricating fluid;
   d) inducing dipoles in said mirrored balls; and
   e) coupling to said dipoles in rotating said mirrored ball;
   f) providing a receiver for energy conversion of said reflected light.

9. The method according to claim 8, wherein said dipoles are electric.

10. The method according to claim 8, wherein said dipoles are magnetic.

11. The method according to claim 8, wherein said miro-optics sheet is a solar concentrator.

12. The method according to claim 8, wherein maintaining said mirrored balls in fixed orientation following rotational alignment occurs by interacting with said cavities.

13. A micro-optics system for concentrating reflected light, comprising;
   a) an array of rotatable cells embedded in an optically transmissive sheet;
   b) a receptive surface in each of said cells;
   c) transparent fluid contained in said cells;
   d) micro-particles dispersed in said fluid;
   e) a field to form and rotate said mirror;
   f) a formed rotatable mirror of said particles on said receptive surface; and
   g) a receiver for energy conversion of the concentrated light.

14. The apparatus of claim 13, wherein said field is electric.

15. The apparatus of claim 13, wherein said field is magnetic.

16. The apparatus of claim 13, wherein a dipole is induced in said formed mirror for rotational linkage.

17. A method for forming and rotatating micro-particle formed mirrors in cells disposed in cavities in an optically transmissive sheet for concentrating reflected light comprising the steps of:
   a) providing a receptive surface in each of said cells;
   b) providing a transparent fluid in each of said cells;
   c) providing micro-particles dispersed in said fluid;
   d) providing a coupling field to form and rotate said mirrors;
   e) forming rotatable mirrors of said particles on said receptive surface; and
   f) providing a receiver for energy conversion of said reflected light.

18. The method according to claim 17, wherein said field is electric.

19. The method according to claim 17, wherein said field is magnetic.

20. The method according to claim 17, wherein said micro-optics sheet is a solar concentrator.

* * * * *